United States Patent
Rowley et al.

(10) Patent No.: US 9,726,309 B1
(45) Date of Patent: Aug. 8, 2017

(54) TUBE CONNECTION NUT AND FERRULE ASSEMBLY

(71) Applicant: Mercury Plastics, Inc., Middlefield, OH (US)

(72) Inventors: William Rowley, Chagrin Falls, OH (US); Donald Currey, Chagrin Falls, OH (US); Earl Christian, Jr., Warren, OH (US); William Blue, Middlefield, OH (US)

(73) Assignee: Mercury Plastics, Inc., Middlefield, OH (US)

( * ) Notice: Subject to any disclaimer, the term of this patent is extended or adjusted under 35 U.S.C. 154(b) by 426 days.

(21) Appl. No.: 14/204,357

(22) Filed: Mar. 11, 2014

Related U.S. Application Data (60) Provisional application No. 61/778,877, filed on Mar. 13, 2013.

(51) Int. Cl.
*F16L 19/06* (2006.01)

(52) U.S. Cl.
CPC ................................ *F16L 19/061* (2013.01)

(58) Field of Classification Search
CPC ..... F16L 19/005; F16L 19/0231; F16L 19/06; F16L 19/061; F16L 19/065; F16L 19/0653
USPC ........................................ 285/387, 332, 385
See application file for complete search history.

(56) References Cited

U.S. PATENT DOCUMENTS

| | | | | |
|---|---|---|---|---|
| 964,579 A | * | 7/1910 | Stephens | F16L 47/24 285/148.13 |
| 969,216 A | * | 9/1910 | Stephens | F16L 33/223 285/247 |
| 1,672,879 A | * | 6/1928 | Campbell, Jr. | F16L 15/006 285/148.4 |
| 1,809,064 A | * | 6/1931 | Pearson | F16L 19/08 16/108 |
| 1,978,047 A | * | 10/1934 | Haury | F16L 19/065 264/DIG. 76 |
| 2,122,205 A | * | 6/1938 | Katzberg | F16L 19/08 285/385 |
| 2,233,214 A | * | 2/1941 | Lamont | F16L 19/0653 277/622 |
| 2,294,637 A | * | 9/1942 | Thomsen | F16L 19/0231 222/545 |

(Continued)

FOREIGN PATENT DOCUMENTS

FR 2729453 B1 7/1996
GB 602737 6/1948

(Continued)

*Primary Examiner* — Brent W Herring
(74) *Attorney, Agent, or Firm* — Hahn Loeser & Parks, LLP (57) ABSTRACT

A nut and ferrule assembly including a nut having an internal-threaded bore along a nut axis and a nut sealing surface, the threads of the internal-threaded bore having a nut thread pitch and a nut thread minor diameter, a ferrule having an annular body forming an axial bore and a ferrule sealing surface, the ferrule sealing surface corresponding to the nut sealing surface, the ferrule further having a protrusion extending outwardly from the body around at least a portion of the body, the outside diameter of the protrusion being greater than the nut thread minor diameter, and the ferrule positioned within the internal-threaded bore.

20 Claims, 7 Drawing Sheets

(56) References Cited

U.S. PATENT DOCUMENTS

| | | | | |
|---|---|---|---|---|
| 2,353,012 A * | 7/1944 | Cheney | F16L 19/0231 | 285/332 |
| 2,389,233 A * | 11/1945 | Cowles | F16L 19/045 | 285/116 |
| 2,497,273 A | 2/1950 | Richardson | | |
| 3,074,747 A * | 1/1963 | Boughton | F16L 19/086 | 285/342 |
| 3,250,550 A * | 5/1966 | Lyon | F16L 19/103 | 285/3 |
| 3,258,279 A * | 6/1966 | Johnsen | F16L 17/073 | 277/622 |
| 3,325,192 A | 6/1967 | Sullivan | | |
| 3,413,021 A * | 11/1968 | Potts | F16L 37/025 | 285/319 |
| 3,433,508 A * | 3/1969 | Teeters | F16L 19/103 | 285/341 |
| 3,848,905 A * | 11/1974 | Hammer | F16L 19/061 | 285/288.1 |
| 4,032,177 A | 6/1977 | Anderson | | |
| 4,076,286 A * | 2/1978 | Spontelli | F16L 19/103 | 285/341 |
| 4,205,417 A * | 6/1980 | Mackal | A61M 25/1018 | 24/115 M |
| 4,275,907 A * | 6/1981 | Hunt | F16L 37/133 | 251/149.1 |
| 4,313,628 A * | 2/1982 | Duenke | F16L 31/00 | 285/115 |
| 4,451,069 A * | 5/1984 | Melone | F16L 37/0842 | 285/315 |
| 4,468,535 A * | 8/1984 | Law | H02G 3/0616 | 174/51 |
| 4,691,726 A | 9/1987 | Studer et al. | | |
| 4,798,404 A * | 1/1989 | Iyanicki | F16L 19/062 | 285/12 |
| 4,900,068 A * | 2/1990 | Law | F16L 33/222 | 285/139.2 |
| 4,993,755 A * | 2/1991 | Johnston | F16L 37/133 | 285/315 |
| 5,058,930 A * | 10/1991 | Schlosser | F16L 19/005 | 285/319 |
| 5,083,819 A * | 1/1992 | Bynum | F16L 19/005 | 285/315 |
| 5,375,887 A * | 12/1994 | Johnson | E03C 1/021 | 285/12 |
| 5,388,866 A * | 2/1995 | Schlosser | F16L 19/005 | 285/319 |
| 5,401,065 A * | 3/1995 | Okumura | F16L 19/06 | 285/328 |
| 5,498,043 A * | 3/1996 | Goldenberg | F16L 33/226 | 285/242 |
| 5,746,454 A * | 5/1998 | Webb | F16L 39/005 | 285/123.12 |
| 5,779,449 A * | 7/1998 | Klein | F04D 29/2222 | 29/453 |
| 5,954,375 A * | 9/1999 | Trickle | F16L 19/065 | 285/342 |
| 6,079,749 A * | 6/2000 | Albino | F16L 19/048 | 285/23 |
| 6,905,142 B2 * | 6/2005 | Do | F16L 19/005 | 285/322 |
| 7,014,215 B2 * | 3/2006 | Cooper | F16L 37/088 | 285/247 |
| 7,367,594 B2 * | 5/2008 | Evans | F16L 33/223 | 285/247 |
| 7,419,192 B2 * | 9/2008 | Benoit | F16L 19/065 | 285/291.1 |
| 8,038,180 B2 | 10/2011 | Williams et al. | | |
| 8,201,854 B2 * | 6/2012 | Ford | G01N 30/6039 | 285/384 |
| 8,740,261 B2 * | 6/2014 | Ford | G01N 30/6039 | 285/342 |
| 8,931,808 B2 * | 1/2015 | Graham | G01N 30/6026 | 285/328 |
| 8,931,810 B2 * | 1/2015 | Clason | F16L 19/103 | 285/342 |
| 2004/0056481 A1 * | 3/2004 | Do | F16L 19/005 | 285/92 |
| 2004/0245776 A1 * | 12/2004 | Evans | F16L 33/223 | 285/259 |
| 2005/0242578 A1 * | 11/2005 | Evans | F16L 33/223 | 285/247 |
| 2006/0138772 A1 * | 6/2006 | Galante | F16L 13/103 | 285/249 |
| 2007/0001451 A1 * | 1/2007 | Struven | F16B 7/182 | 285/318 |
| 2008/0007048 A1 * | 1/2008 | Benoit | F16L 19/065 | 285/247 |
| 2009/0295156 A1 * | 12/2009 | Ford | G01N 30/6026 | 285/384 |
| 2011/0181042 A1 * | 7/2011 | Clason | F16L 19/103 | 285/343 |
| 2011/0316273 A1 * | 12/2011 | Hong | F16L 19/065 | 285/344 |
| 2012/0223520 A1 * | 9/2012 | Graham | G01N 30/6039 | 285/332 |
| 2012/0223522 A1 * | 9/2012 | Graham | G01N 30/6026 | 285/385 |
| 2012/0319400 A1 * | 12/2012 | Ford | F16L 19/065 | 285/354 |
| 2013/0147189 A1 * | 6/2013 | Horsfall | F16L 19/046 | 285/353 |
| 2014/0117660 A1 * | 5/2014 | Smith | H02G 3/088 | 285/141.1 |
| 2015/0061283 A1 * | 3/2015 | Peirce | F16L 19/0653 | 285/291.1 |
| 2015/0167873 A1 * | 6/2015 | Arstein | F16L 19/103 | 285/382.7 |
| 2015/0276102 A1 * | 10/2015 | Yoon | F16L 19/103 | 285/385 |

FOREIGN PATENT DOCUMENTS

| | | | | |
|---|---|---|---|---|
| GB | 1365815 | | 9/1974 | |
| GB | 2095780 A | * | 10/1982 | F16L 19/086 |
| JP | 03079892 A | * | 4/1991 | |

* cited by examiner

TUBE CONNECTION NUT AND FERRULE ASSEMBLY

This application claims the benefit of U.S. Provisional Application 61/778,877, filed Mar. 13, 2013.

BACKGROUND

The present disclosure relates generally to a nut and ferrule assembly for a tube connection in which the ferrule is positioned around the tube and assembling the nut onto a mating threaded connector presses the ferrule into sealing engagement with the surface of the tube.

Tube connections using a nut and ferrule have been known for many applications, for example a plumbing connection of a tube to a valve for a water supply line. In certain applications, a tube is used to connect the water supply valve to a faucet, toilet, or other plumbing fixture. In these applications, the water supply valve includes a threaded waterway outlet sized for receiving the tube end within the outlet. A nut and a ferrule is provided around the tube end such that the nut can be assembled onto the threaded outlet capturing the ferrule between the nut and the waterway outlet. The tightening of the nut onto the threaded outlet presses the ferrule into sealing engagement with the surface of the tube and the waterway outlet to seal the connection.

For many applications, the prior ferrules are small rings, such as for tubes having an outside diameter between about 1/16 inch and 1 inch. Many common prior ferrules are packaged separately from the nuts, requiring assembly of the prior ferrules separately from the prior nuts. As such, placing the prior ferrules onto a tube end could be challenging. Typically, the nut was placed onto the tube end before the ferrule. When the assembler installed the ferrule and forgot to install the nut first, the ferrule had to be removed for the nut to be placed, adding inefficiency to the installation. Additionally, some ferrules have a front and a back, with the sealing surface geometry having to be oriented properly during assembly. When the ferrule was assembled backwards, the connection could leak. Further, the tightening of a backward ferrule could damage the ferrule to the extent that it could not be used again.

SUMMARY OF THE DISCLOSURE

What is disclosed is a nut and ferrule assembly having
a nut having an internal-threaded bore along a nut axis, the threads of the internal-threaded bore having a nut thread pitch and a nut thread minor diameter, the threads forming a groove inside the nut between the threads and a rear wall of the nut,
a ferrule comprising an annular body forming an axial bore and a ferrule sealing surface operable to seal with a corresponding sealing surface on said mating component,
the ferrule further comprising a protrusion extending outwardly from the annular body, the outside diameter of the protrusion being greater than the nut thread minor diameter, and
the ferrule positioned within the internal-threaded bore with the protrusion engaging the groove.

Alternatively, a nut and ferrule assembly is disclosed having
a nut having an internal-threaded bore along a nut axis and a nut sealing surface, the threads of the internal-threaded bore having a nut thread pitch and a nut thread minor diameter,
a ferrule comprising an annular body forming an axial bore and a ferrule sealing surface, the ferrule sealing surface corresponding to the nut sealing surface, the ferrule body having a body diameter smaller than the nut thread minor diameter,
the ferrule further comprising at least one protrusion extending outwardly from the body, the outside diameter of the protrusion being greater than the nut thread minor diameter, and
the ferrule positioned within the internal-threaded bore with the at least one protrusion engaging the threads of the internal-threaded bore.

Also disclosed is a ferrule for use in a ferrule nut assembly, the ferrule comprising an annular body forming an axial bore, the ferrule having at least one protrusion extending outwardly from the body.

DETAILED DESCRIPTION OF THE DRAWINGS

Figure 1:
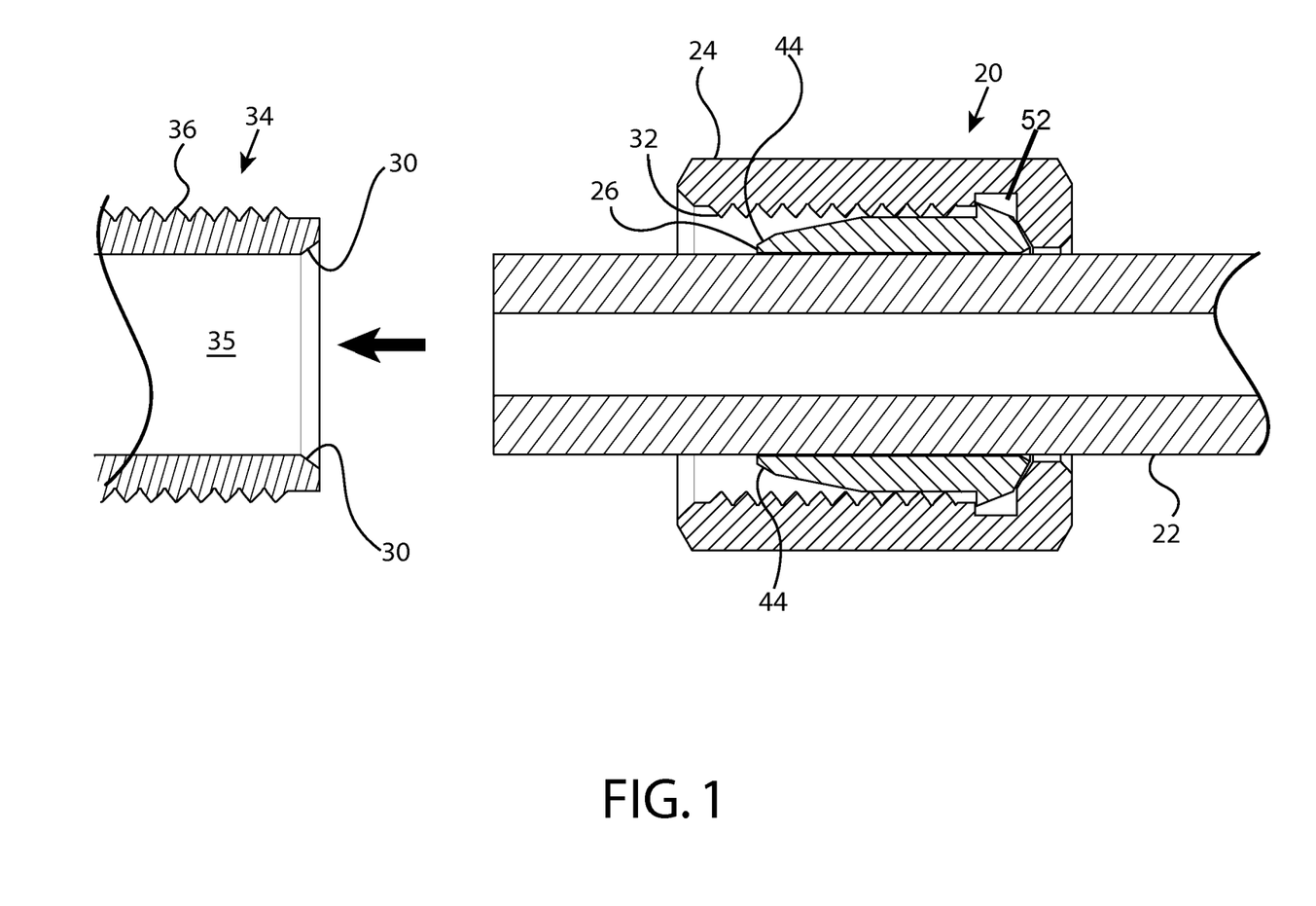
FIG. 1 is a cross-sectional view through a nut and ferrule assembly on a tube.
Figure 2:
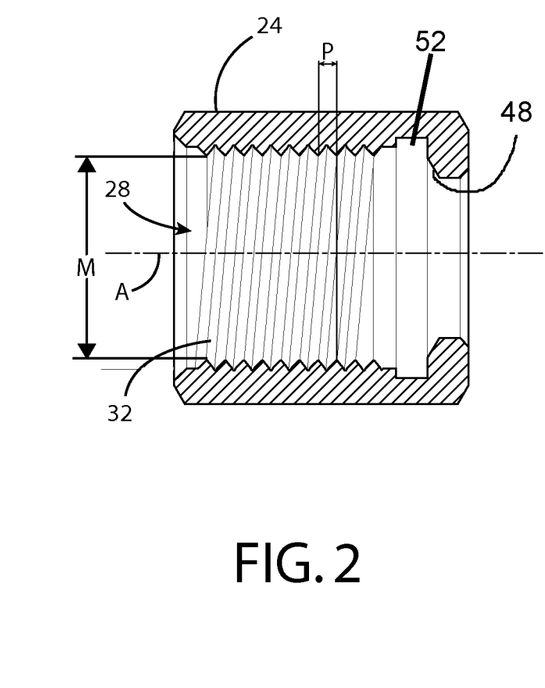
FIG. 2 is a cross-sectional view through the nut of FIG. 1.

Referring now to FIG. 1, a nut and ferrule assembly is connectable with a mating connection component, typically for connecting the end of a tube, pipe, or other conduit to the mating component, in which the ferrule is positioned around the tube and assembling the nut onto a mating threaded connector presses the ferrule into sealing engagement with the surface of the tube. As shown in FIG. 1, a nut and ferrule assembly 20 is provided on a tube 22. The nut and ferrule assembly includes a nut 24 and a ferrule 26. As shown in FIG. 2, the nut 24 has an internal-threaded bore 28 along an axis A. The internal-threaded bore 28 includes threads 32 having a nut thread pitch and a nut thread minor diameter, shown as M in FIG. 2. Thread pitch is the distance from one thread to the next in the axial direction, shown as P in FIG. 2, which may be expressed in terms of threads per inch. The minor diameter M, as shown in FIG. 2, is the smallest diameter of the threads, which for the internal threads 32 is the inside diameter of the nut 24 at the tip of the threads.

Figure 3:
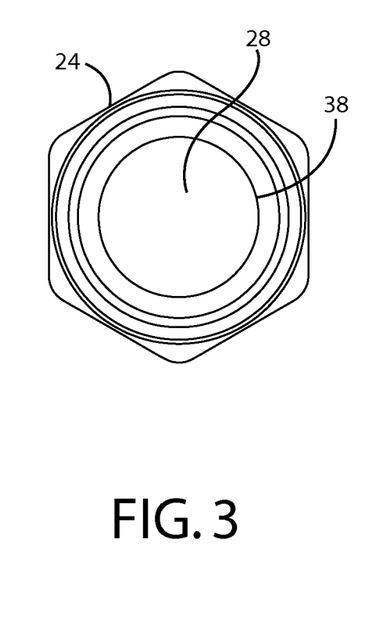
FIG. 3 is an end view of the nut and ferrule assembly.

The threads 32 correspond to external threads 36 on a mating connection component 34, a partial view of which is shown in FIG. 1. The mating connection 34 may be, for example, a plumbing fitting such as a waterway valve or any other suitable connection as desired. For certain tube connecting applications, the mating connection 34 may include a tube-receiving aperture 35, into which a portion of the end of the tube 22 may be positioned when installed, as indicated by an arrow in FIG. 1. The mating connection component 34 further includes a sealing surface 30 positioned for sealingly engaging corresponding sealing surfaces 44 on the ferrule 26. The mating connection component 34 includes external threads 36 corresponding to the threads 32 of the nut 24. As shown in FIG. 3, the nut 24 includes a rear wall 48 having an aperture 38 through the rear wall 48, the aperture 38 sized for the tube 22 to pass through.

Figure 4:
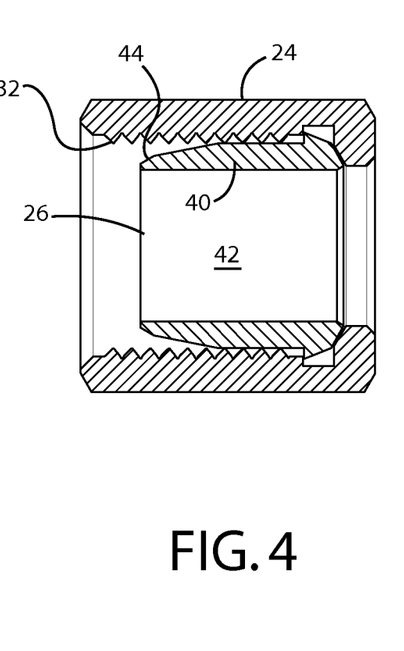
FIG. 4 is a cross-sectional view through the nut and ferrule assembly of FIG. 1.
Figure 5:
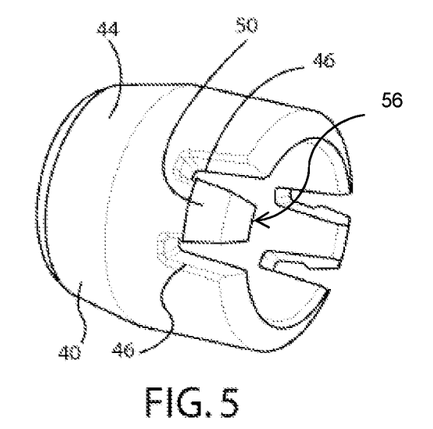
FIG. 5 is a perspective view of the ferrule for the nut and ferrule assembly of FIGS. 1 and 3.
Figure 5A:
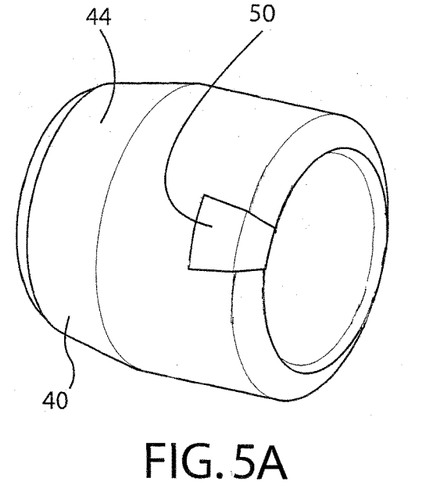
FIG. 5A is a perspective view of an alternative to the ferrule of FIG. 5.
Figure 6:
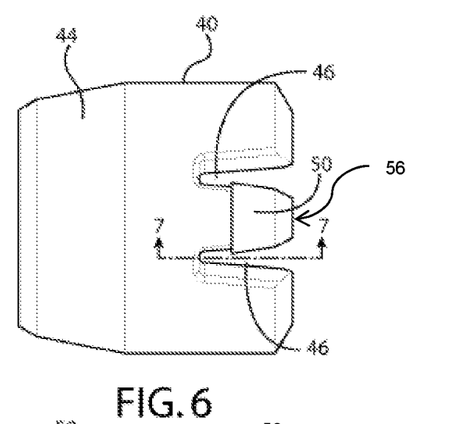
FIG. 6 is a side view of the ferrule of FIG. 1.
Figure 6A:
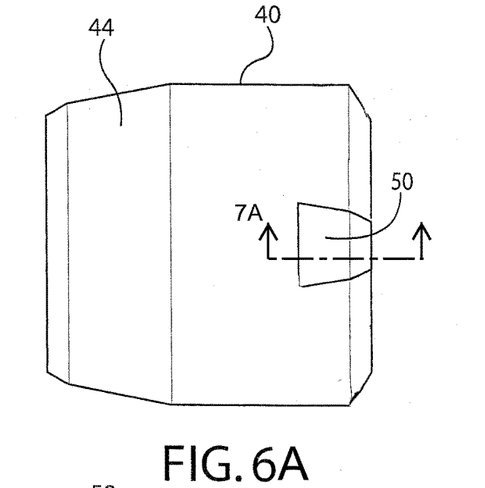
FIG. 6A is a side view of the ferrule of FIG. 5A.
Figure 7:
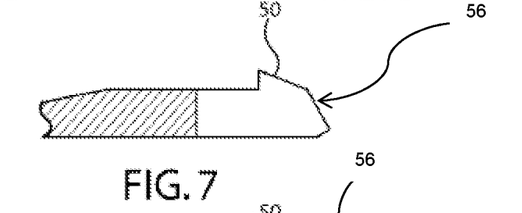
FIG. 7 is a partial sectional view of the ferrule of FIG. 6 through section 7-7.
Figure 7A:
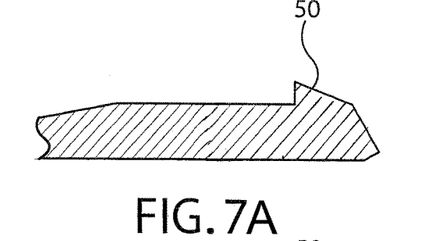
FIG. 7A is a partial sectional view of the ferrule of FIG. 6A through section 7A.
Figure 8:
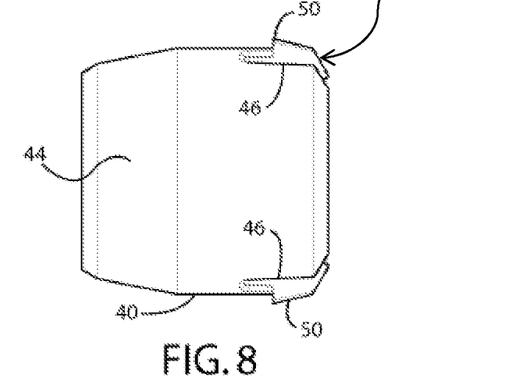
FIG. 8 is another side view of the ferrule of FIG. 1.
Figure 8A:
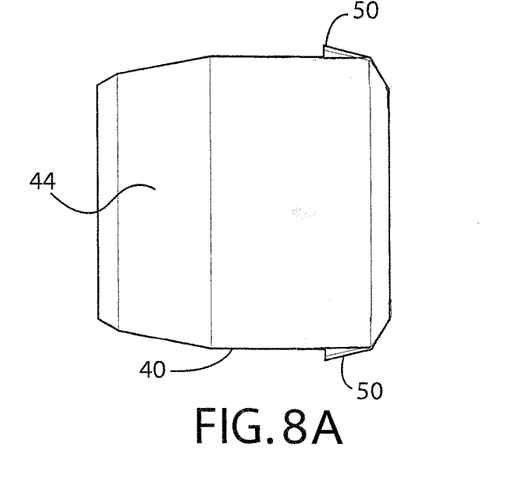
FIG. 8A is another side view of the ferrule of FIG. 5A.

As shown in FIGS. 4 and 5, the ferrule 26 includes an annular body 40 forming an axial bore 42 and a ferrule sealing surface 44, the ferrule sealing surface 44 corresponding to the sealing surface 30 on the mating connection component 34. The axial bore 42 is configured for the tube 22 to pass through the bore 42 and provide a sealing engagement with the outside surface of the tube when installed in a tube connection. The inside diameter of the bore 42 is nearly the same as or greater than the outside diameter of the tube 22, the bore diameter being sized for the tube to fit in the bore 42 of the ferrule. The bore diameter is similar in size to the outside diameter of the tube 22 such that compression of the ferrule around the tube will provide sealing engagement between at least a portion of the axial bore inside surface and the outside surface of the tube 22. During installation of the nut and ferrule assembly 20 and tube 22 with a mating connection 34, the tightening of the nut 24 onto the external threads 36 presses at least a portion of the ferrule body into sealing engagement with the surface of the tube and the ferrule sealing surface 44 against the sealing surface 30 of the mating connection 34 to seal the tube connection. In one example, the bore diameter is a slip fit less than 0.005 inch greater than the tube outside diameter.

The diameter of the ferrule body 40 and the location and size of the protrusions 50 are configured to inhibit, if not prevent, the ferrule from falling out of the nut 24 during shipping, handling, and installation of the nut and ferrule assembly. Additionally, the length of the ferrule 26 and the diameter of the ferrule body 40 may be selected to inhibit tilting of the ferrule 26 within the nut 24. We have found that when the ferrule is tilted in the nut, the assembly of the ferrule onto the end of the tube tends to be more difficult because the tilted ferrule is misaligned with the tube. In the example shown in FIGS. 1 and 3, the ferrule body 40 has a diameter similar to the nut minor diameter M, and may be smaller than the nut minor diameter.

The ratio of the length L of the ferrule 26 to the inside diameter D of the bore 42 may be greater than 1 (L and D shown in FIG. 4). Alternatively, the ratio of the length of the ferrule to the bore diameter may be greater than 1.25. In alternative embodiments, the ratio of the length of the ferrule to the bore diameter is less than 1.0, and more particularly greater than 0.6. In yet another alternative, the ratio of the length of the ferrule to the ferrule bore diameter is greater than 0.8.

The ferrule 26 and the nut 24 may be sized, for example, for use with a ⅜ inch outside diameter tube, where the nut threads 32, for example, may be 9/16 inch threads having a 0.517 inch minor diameter and a thread pitch of 24 threads per inch Unified Thread Standard, Extra Fine (UNEF). Alternatively, the nut and ferrule assembly 20 may be sized for a 5/16 inch tube, for which the nut 24 may include, for example, a ½ inch size nut thread 32 having a 0.461 inch minor diameter at a pitch of 28 threads per inch UNEF. In another alternative, the nut and ferrule assembly 20 may be sized for a ¼ inch tube, for which the nut 24, may include, for example, ⅜ inch size nut threads 32 having a 0.341 inch minor diameter and a pitch of 32 threads per inch UNEF. In yet another alternative, the nut and ferrule assembly 20 may be sized for a ½ inch tube, for which the nut 24, may include, for example, ¾ inch size nut threads 32 having a 0.696 inch minor diameter and a pitch of 20 threads per inch UNEF. It is contemplated that the ferrule 26 and the nut 24 may be sized and adapted for any connections of tube sizes up to 1 inch diameter, and may be greater than 1 inch diameter, and may use any thread style and thread specification as desired.

As shown in FIG. 5, the ferrule body 40 may include a cylindrical portion along the body outside diameter adjacent the sealing surface 44. In other alternatives, the ferrule body 40 may be tapered, arcuate, or other shape as desired for the application. The ferrule body 40 may have an outside diameter smaller than the nut thread minor diameter M for ease of assembly. However, the ferrule 26 includes at least a portion of the ferrule body 40 that is greater in diameter than the nut thread minor diameter M such that the nut threads 32 engage the ferrule retaining the ferrule in the nut 24 prior to connection with a mating connection component.

As shown in the examples of FIGS. 5-8, the ferrule 26 may include at least one protrusion 50 extending outwardly from the body 40. Typically, the outside diameter of the protrusion 50 is greater than the nut thread minor diameter such that the protrusion is retained by the threads 32. In one application, the outside diameter of the protrusion is greater than the nut thread minor diameter by less than 0.04 inch. Alternatively, the outside diameter of the protrusion is greater than the nut thread minor diameter by less than 0.02 inch. In yet another alternative, the outside diameter of the protrusion is greater than the nut thread minor diameter by less than 0.06 inch.

As shown in FIGS. 1 and 3, the nut 24 may include a groove 52 between the threads 32 and the rear wall 48 of the nut, formed by the threads 32 stopping in the nut before reaching the rear wall of the nut. The cavity 52 may be provided for receiving the protrusion 50 disengaged from the threads.

In the embodiment of FIGS. 5-8, at least one protrusions 50 is formed on a flexible tab 56 formed in the wall of the ferrule 26. To form the tab 56, two slots 46 are formed in the ferrule, the slots 46 separated a distance being the width of the tab 56. The tabs 56 ease assembly by enabling the protrusion 50 to temporarily deflect away from the threads 32 of the nut 24 releasing interference and reducing damage to the protrusion and ferrule when the ferrule is pressed into the nut. In the installed position, the ferrule 26 is positioned in the nut 24 with the protrusions 50 engaged in the groove 52 inhibiting back-out of the ferrule from the nut. In the embodiment shown in FIGS. 5-8, the ferrule includes two tabs 56 and two protrusions 50 spaced equidistant around the ferrule body. Alternatively, one tab 56 and one protrusion 50 may be provided to retain the ferrule assembled in the nut, or alternatively one tab 56 with one protrusions 50 and one or more additional protrusions positioned on the ferrule body without a tab. In another alternative, three or more tabs 56 may be spaced around the ferrule body as desired.

In the embodiment of FIGS. 5A-8A, the protrusions 50 are formed on the outer wall of the ferrule body 40, optionally without the slots 46. For certain applications, the material properties of the nut and ferrule and the clearances between the nut and ferrule are such that the ferrule can be pushed into the nut retaining the function of the protrusion 50 without having the slots. In this embodiment, the ferrule 26 is positioned in the nut 24 in the installed position with the protrusions 50 engaged in the groove 52 inhibiting back-out of the ferrule from the nut in the same manner as shown in FIG. 4. In the embodiment shown in FIGS. 5A-8A, the ferrule includes two protrusions 50 spaced equidistant around the ferrule body. Alternatively, one protrusion 50 may be provided to retain the ferrule assembled in the nut. In another alternative, three or more tabs 56 may be spaced around the ferrule body as desired for the application.

In any of the embodiments herein, the protrusion 50 may have a triangular or thread-shaped cross-section similar to that of the nut thread 32. Alternatively, the protrusion 50 may have a rectangular cross-sectional shape, polygonal cross-sectional shape, arcuate cross-sectional shape, or other cross-sectional shape as desired.

Figure 9:
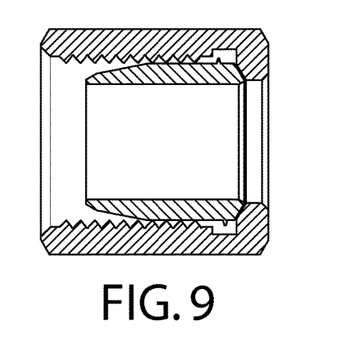
FIG. 9 is a cross-sectional view through a first alternative nut and ferrule assembly.
Figure 10:
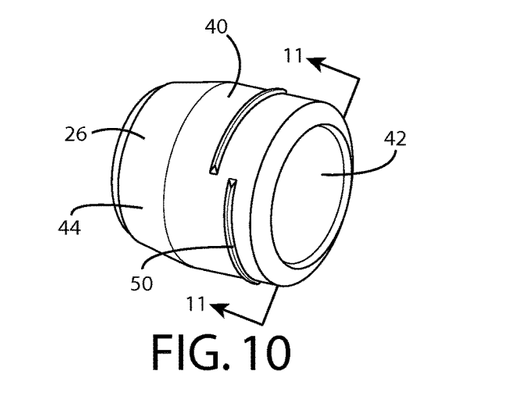
FIG. 10 is a perspective view of the alternative ferrule for the nut and ferrule assembly of FIG. 9.
Figure 11:
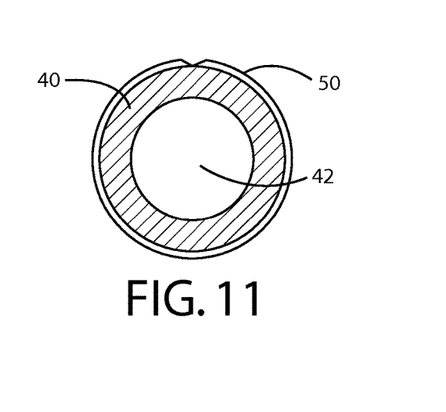
FIG. 11 is a cross-sectional view through the ferrule of FIG. 10.
Figure 12:
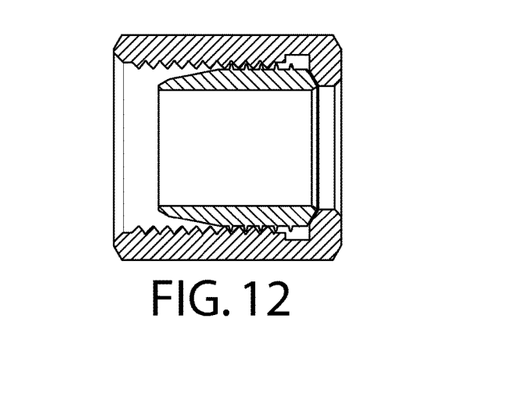
FIG. 12 is a cross-sectional view through a second alternative nut and ferrule assembly.

In another embodiment, one or more protrusions 50 may extend along a helical direction around at least a portion of the body 40 along the bore 42, where the helical direction of the protrusion has a thread angle and pitch approximately the same as the nut thread angle and pitch. As shown in FIGS. 9-11, the protrusion 50 may form a single thread around a portion of the ferrule body. The protrusion 50 may be sized and positioned such that the ferrule may be threaded into the nut. As shown in FIG. 9, when the ferrule is fully installed in the nut, the protrusion 50 may turn out of the nut threads 32 into the groove 52 inhibiting back-out of the ferrule from the nut.

The ferrule may be configured to be positioned within the internal-threaded bore 28 of the nut 24 with the at least one protrusion 50 engaging the threads 32 of the internal-threaded bore 28. The protrusion 50 may be sized and positioned in any orientation as desired to engage the threads 32. Alternatively or additionally, the protrusion 50 may be deformable by the threads 32 of the internal-threaded bore 28.

Figure 13:
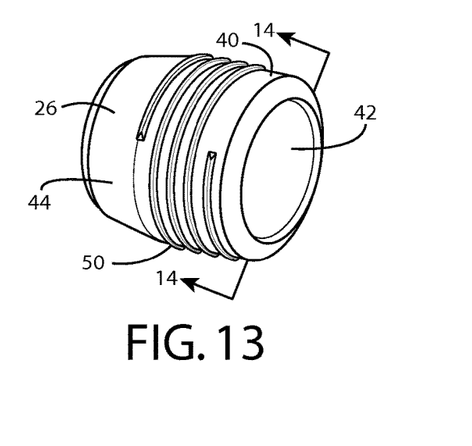
FIG. 13 is a perspective view of the alternative ferrule for the nut and ferrule assembly of FIG. 12.
Figure 14:
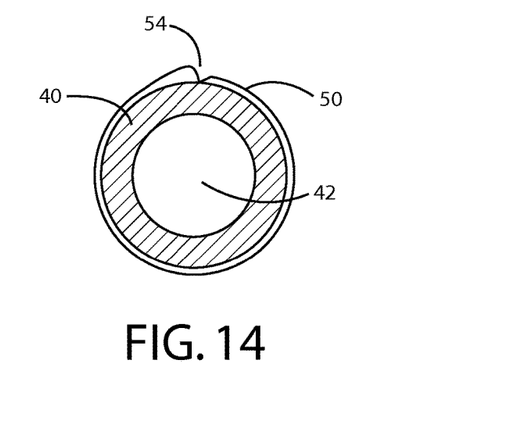
FIG. 14 is a cross-sectional view through the ferrule of FIG. 13.

In one example shown in FIGS. 13 and 14, the protrusion 50 may extend along a helical direction one or more revolutions around the body 40 along the bore 42. The helical direction of the protrusion may have a pitch approximately the same as the nut thread pitch. As one example, the protrusion of FIG. 13 extends nearly four body diameters around the ferrule body 40 having a pitch matching that of the corresponding nut.

A typical standard UNEF thread for 9/16 inch, 24 thread per inch threads, has a thread height of about 0.023 inch and width of about 0.042 inch wide at the base of the thread. In the example of FIGS. 13 and 14, the protrusion 50 has a triangular cross section approximately 0.013 inch wide at the base of the protrusion and extending 0.018 inch from the ferrule body. The protrusion 50 of this example is smaller in height and width than a corresponding standard UNEF thread cross-sectional shape. Alternatively, the protrusion may have a cross-sectional shape matching the thread shape and size of the nut thread.

Optionally, as shown in FIG. 14, the protrusion 50 may have a first cross-sectional shape, and a lead portion 54 having a second cross-sectional shape at the lead end of the protrusion. As shown in FIG. 14, the second cross-sectional shape of the lead portion 54 of the protrusion may have be larger than the first cross-sectional shape of the protrusion. In one application, the second cross-sectional shape of the lead portion 54 may for an interference fit with the threads 32 to inhibit the ferrule from backing out of the nut during shipping. Alternatively, or additionally, the second cross-sectional shape of the lead portion 54 may be a standard thread profile for threaded engagement with the nut threads 32. In this example, the lead portion 54 may extend along any desired length of the protrusion, such as between about 3% and about 50% of the protrusion. More preferably, the lead portion 54 extends between about 5% and 20% of the length of the protrusion. In one example, the lead portion 54 extends 45 degrees around the body, or about 1/8 of one body diameter. The lead portion 54 may be any length as desired to guide the ferrule into the nut.

Figure 15:
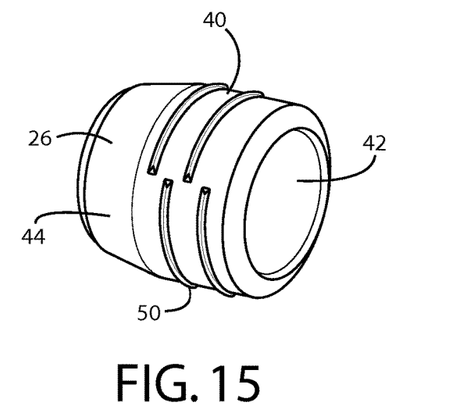
FIG. 15 is a perspective view of a third alternative ferrule.

In the example of FIG. 10, the protrusion 50 may be a single protrusion extending less than one body diameter around the ferrule 26. In the example of FIG. 15, the protrusion 50 includes two or more separate protrusions each extending at least partially around the ferrule.

Figure 16:
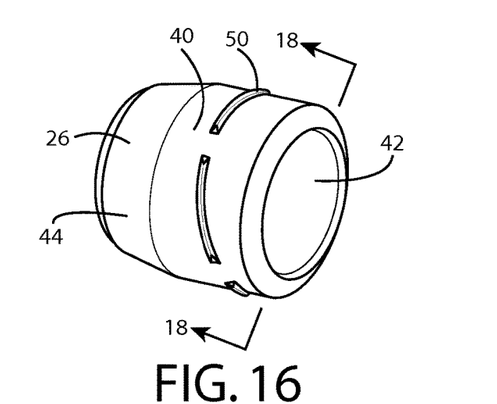
FIG. 16 is a perspective view of a fourth alternative ferrule.
Figure 17:
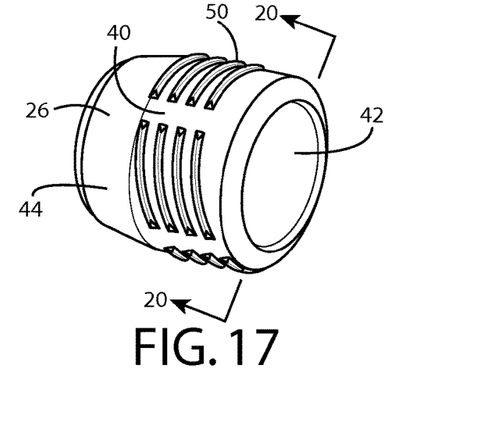
FIG. 17 is a perspective view of a fifth alternative ferrule.
Figure 18:
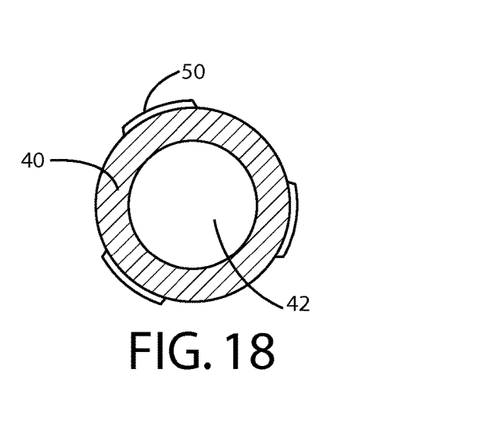
FIG. 18 is a cross-sectional view through the ferrule of FIG. 16.
Figure 19:
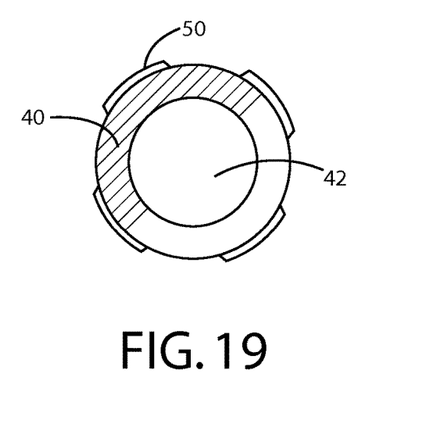
FIG. 19 is an cross-sectional view through an alternative ferrule design for FIG. 16.
Figure 20:
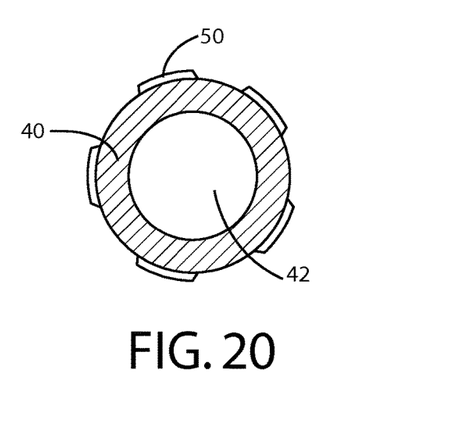
FIG. 20 is a cross-sectional view through the ferrule of FIG. 17.

As shown in FIGS. 16 and 17, the protrusion 50 may include a plurality of segments along the helical direction around at least a portion of the body. The segmented protrusion may include three segments spaced around the body diameter for each helical turn or rotation of the protrusion around the ferrule body 40 as shown in FIG. 18. Alternatively, the segmented protrusion may include four segments spaced around the body diameter for each helical rotation of the protrusion around the ferrule body 40 as shown in FIG. 19. In yet another alternative, the segmented protrusion may include five segments spaced around the body diameter for each helical rotation of the protrusion around the ferrule body 40 as shown in FIG. 20. It is contemplated that the protrusion may be segmented into any number of segments about the body diameter, such as any number of segments per body diameter in a range between about 2 and 10, or more. For segmented protrusions having a plurality of helical turns about the ferrule body, the segments may be axially aligned as shown in FIG. 17. Alternatively, the segments may be staggered from one helical turn to the next (not shown). In another alternative, not shown, one or more concentric protrusions may be provided segmented into a plurality of segments around the body diameter.

Figure 21:
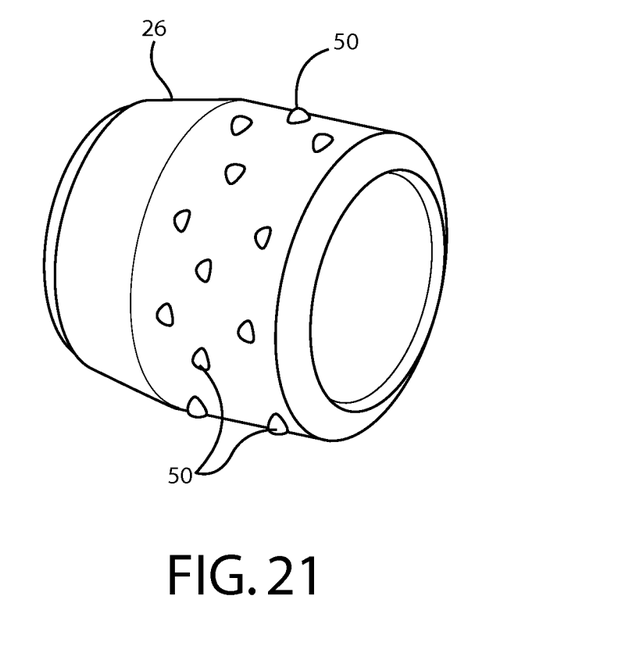
FIG. 21 is a perspective view of a sixth alternative ferrule for the nut and ferrule assembly.

Alternatively, one or more protrusions 50 may extend along a concentric direction around at least a portion of the ferrule body 40. In yet another alternative, one or more protrusions 50 may be positioned in any orientation as desired, such as a pattern of protrusions about at least a portion of the ferrule body, or in random positions about at least a portion of the ferrule body. In example shown in FIG. 21, the protrusions 50 may be bumps formed on the surface of the ferrule body 40. Alternatively, such as shown in FIG.

Figure 22:
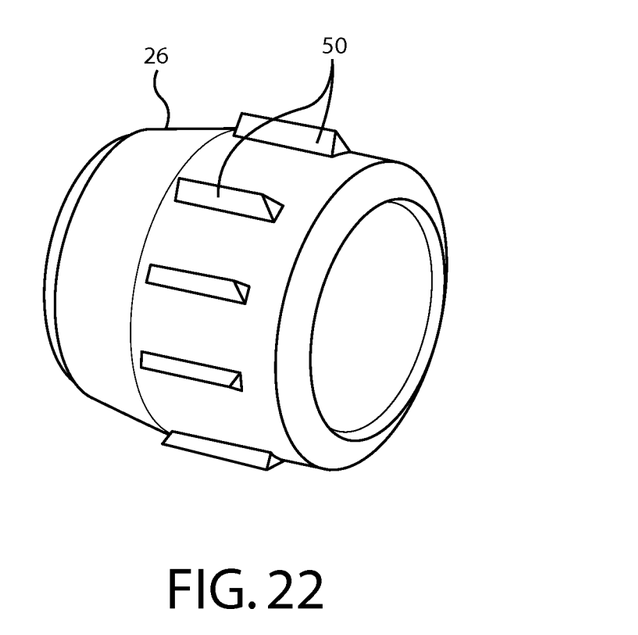
FIG. 22 is a perspective view of a seventh alternative ferrule for the nut and ferrule assembly.

22, the protrusions 50 may be axially extending protrusions that threads 32 deform or cut through upon installation.

In the practice of this invention, illustrative and non-limiting examples of polymeric materials that may be used in various combinations to form the ferrule include: polyacetals, nylons or polyamides, including various types of nylon-6, nylon-6/6, nylon-6/9, nylon-6/10, nylon-6/12, nylon-11, nylon-12, polyethylene homopolymers and copolymers, including all molecular weight and density ranges and degrees of crosslinking, polypropylene homopolymers and copolymers, polybutene resins, ethylene acid copolymers, polyimides, polyvinyl chlorides and chlorinated polyvinyl chlorides, ethylene-vinyl acetate copolymers, ethylene-vinyl alcohol co polymers, acrylonitrile butadiene styrene terpolymers, and thermoplastic elastomers covering a hardness range of from 30 Shore A to 75 Shore D, including styrenic block copolymers, polyolefin blends (TPO), elastomeric alloys, thermoplastic polyurethanes (TPU), thermoplastic copolyesters, and thermoplastic polyamides. Other polymeric materials may be selected as suitable for a desired application.

In the practice of this invention, illustrative and non-limiting examples of metals that may be used in various combinations to form the ferrule include: brass, copper, zinc, stainless steel, alloy steel, and carbon steel. Other metals may be selected as suitable for a desired application.

In the practice of this invention, illustrative and non-limiting examples of the polymers that may be used in various combinations to form the nut include: polyacetals, nylons or polyamides, including various types of nylon-6, nylon-6/6, nylon-6/9, nylon-6/10, nylon-6/12, nylon-11, nylon-12, acrylonitrile butadiene styrene terpolymers, polystyrenes, polycarbonates, polyvinyl chlorides and chlorinated polyvinyl chlorides, polyethylene homopolymers and copolymers, including all molecular weight and density ranges and degrees of crosslinking, polypropylene homopolymers and copolymers, polybutene resins, poly(meth)acrylics, polyalkylene terephthalates, polyetherimides, polyimides, polyamide-imides, polyacrylates of aromatic polyesters, polyarylether ketones, polyacrylonitrile resins, polyphenylene oxides including polystyrene miscible blends, polyphenylene sulfides, styrene-acrylonitrile copolymers, styrene-butadiene copolymers, styrene maleic anhydride copolymers, polyarylsulf ones, polyethersulf ones, polysulf ones, ethylene acid copolymers, ethylene-vinyl acetate copolymers, ethylene-vinyl alcohol copolymers, thermoplastic elastomers covering a hardness range of from 30 Shore A to 75 Shore D, including styrenic block copolymers, polyolefin blends (TPO), elastomeric alloys, thermoplastic polyurethanes (TPU), thermoplastic copolyesters, and thermoplastic polyamides, polyvinylidene chlorides, allyl thermosets, bismaleimides, epoxy resins, phenolic resins, unsaturated thermoset polyesters, thermoset polyimides, thermoset polyurethanes, and urea and melamine formaldehyde resins. Other polymeric materials may be selected as suitable for a desired application.

In the practice of this invention, illustrative and non-limiting examples of metals that may be used in various combinations to form the nut include: brass, copper, zinc, stainless steel, alloy steel, and carbon steel. Other metals may be selected as suitable for a desired application.

For one application of the present invention, the ferrule is made from polyacetal and the nut is made from brass. In another application of the present invention, both the nut and ferrule are made of polyacetal. It is contemplated that the material for the nut and the material for the ferrule each may be any metals or polymeric materials as desired to satisfy design requirements and environmental parameters of a particular application such as temperature, pressure, size, chemical exposure, irradiation, applied mechanical forces, and other factors according to the desired application.

To assemble the ferrule 26 into the nut 24, the ferrule may be positioned on a core pin or mandrel having an outer diameter similar to the inside diameter of the ferrule bore 42 providing a friction fit between the ferrule and the core pin. Then, the ferrule 26 may be pressed axially into the nut. Alternatively, the nut may be rotated onto the ferrule, or the core pin and ferrule rotated into the nut, or a combination of both, such that the nut threads 32 engage the protrusion 50. Typically, the axial bore of the ferrule is along the nut axis. In certain applications, the axial bore of the ferrule is concentric with the nut axis.

The ferrule may be removable from the nut by rotating the nut so that the protrusion engages the nut threads and turns out of the nut. In certain embodiments, the ferrule may be pressed axially outwardly until the protrusions engage the nut threads, and then the ferrule can be rotated out. In certain applications, the ferrule is adapted to be pressed axially out of the nut.

While the invention has been illustrated and described in detail in the drawings and foregoing description, the same is to be considered as illustrative and not restrictive in character, it being understood that only preferred embodiments have been shown and described and that all changes and modifications that come within the spirit of the invention are desired to be protected by the appended claims and the equivalents thereof.

What is claimed is:

1. A nut and ferrule assembly connectable with a mating component comprising:
   a nut having an internal-threaded bore along a nut axis, the threads of the internal-threaded bore having a nut thread pitch and a nut thread minor diameter, the threads forming a groove inside the nut between the threads and a rear wall of the nut,
   a ferrule comprising an annular body forming an axial bore and a ferrule sealing surface operable to seal with a corresponding sealing surface on said mating component,
   the ferrule further comprising a protrusion extending outwardly from the annular body, the outside diameter of the protrusion being greater than the nut thread minor diameter,
   the ferrule positioned within the internal-threaded bore with the protrusion engaging the groove, and
   the ferrule includes at least a portion of the annular body that is greater in diameter than the nut thread minor diameter such that the nut threads engage the ferrule, retaining the ferrule in the nut prior to connection with the mating component.

2. The nut and ferrule assembly of claim 1, where one of the protrusion is positioned on a tab formed in the ferrule body.

3. The nut and ferrule assembly of claim 1, where the protrusion extends around at least a portion of the body along a helical direction.

4. The nut and ferrule assembly of claim 1, where the protrusion is a single helical protrusion extending one or more body diameter around the ferrule.

5. The nut and ferrule assembly of claim 1, the protrusion being deformable by the threads of the internal-threaded bore.

6. The nut and ferrule assembly of claim 1, where the difference between the outside diameter of the protrusion and the nut thread minor diameter is less than 0.04 inch.

7. The nut and ferrule assembly of claim 1, the protrusion includes two or more protrusions extending outwardly from the annular body.

8. The nut and ferrule assembly of claim 1, where the protrusion is a plurality of segments along a helical direction around at least a portion of the body.

9. The nut and ferrule assembly of claim 8, where the plurality of segments comprises three protrusion segments along the helical direction spaced around one body diameter of the ferrule.

10. The nut and ferrule assembly of claim 1, where a helical direction of the protrusion has a pitch approximately the same as the nut thread pitch.

11. The nut and ferrule assembly of claim 1, the ratio of the length of the ferrule to the ferrule bore diameter being greater than 0.6.

12. A nut and ferrule assembly connectable with a mating component comprising:
 a nut having a rear wall and an internal-threaded bore along a nut axis, the threads of the internal-threaded bore having a nut thread pitch and a nut thread minor diameter,
 a ferrule comprising an annular body forming an axial bore and a ferrule sealing surface operable to seal with a corresponding sealing surface on said mating component,
 the ferrule further comprising a protrusion extending outwardly from the annular body, the outside diameter of the protrusion being greater than the nut thread minor diameter,
 the ferrule positioned within the internal-threaded bore with the protrusion engaging the threads of the internal-threaded bore and the ferrule contacting the rear wall of the nut.

13. The nut and ferrule assembly of claim 12, where the protrusion is positioned on a tab formed in the ferrule body.

14. The nut and ferrule assembly of claim 12, where the protrusion extends around at least a portion of the body along a helical direction.

15. The nut and ferrule assembly of claim 14, where the protrusion is a single helical protrusion extending one or more body diameter around the ferrule.

16. The nut and ferrule assembly of claim 12, comprising two or more protrusions extending outwardly from the annular body.

17. The nut and ferrule assembly of claim 12, where the protrusion comprises a plurality of segments along a helical direction around at least a portion of the body.

18. The nut and ferrule assembly of claim 17, where the plurality of segments comprises three protrusion segments along the helical direction spaced around one body diameter of the ferrule.

19. The nut and ferrule assembly of claim 12, where a helical direction of the protrusion has a pitch approximately the same as the nut thread pitch.

20. The nut and ferrule assembly of claim 1, where the ferrule contacts the rear wall of the nut.

* * * * *